United States Patent
Perrins

(10) Patent No.: US 6,851,276 B2
(45) Date of Patent: Feb. 8, 2005

(54) STORAGE DEVICE FOR DRINK CONTAINERS

(76) Inventor: John Granville Perrins, 9 Melaleuca Drive, Strathpine, Queensland (AU), 4500

( * ) Notice: Subject to any disclaimer, the term of this patent is extended or adjusted under 35 U.S.C. 154(b) by 30 days.

(21) Appl. No.: 10/398,145

(22) PCT Filed: Oct. 10, 2001

(86) PCT No.: PCT/AU01/01277
§ 371 (c)(1),
(2), (4) Date: Apr. 2, 2003

(87) PCT Pub. No.: WO02/31417
PCT Pub. Date: Apr. 18, 2002

(65) Prior Publication Data
US 2004/0025530 A1 Feb. 12, 2004

(30) Foreign Application Priority Data
Oct. 10, 2000 (AU) ............................................. PR 0661
Mar. 26, 2001 (AU) ............................................. PR 3971
Jul. 12, 2001 (AU) ............................................. PR 6358

(51) Int. Cl.$^7$ ................................................. F25D 3/08
(52) U.S. Cl. ........................ 62/457.5; 62/371; 62/457.2; 62/530
(58) Field of Search ........................... 62/457.1, 457.2, 62/457.3, 457.4, 457.5, 371, 530

(56) References Cited

U.S. PATENT DOCUMENTS

| | | | |
|---|---|---|---|
| 3,998,072 A | | 12/1976 | Shaw |
| 4,870,837 A | | 10/1989 | Weins |
| 4,916,923 A | * | 4/1990 | Adams et al. .............. 62/457.1 |
| 5,058,397 A | * | 10/1991 | MacDonald ................ 62/457.2 |
| 5,181,394 A | * | 1/1993 | Schea et al. ................... 62/371 |
| 5,924,303 A | | 7/1999 | Hodosh |
| 6,044,650 A | | 4/2000 | Cook et al. |

FOREIGN PATENT DOCUMENTS

| | | |
|---|---|---|
| DE | 28 30 084 | 1/1980 |
| GB | 2 025 593 A | 1/1980 |

* cited by examiner

Primary Examiner—Melvin Jones
(74) Attorney, Agent, or Firm—Young & Thompson

(57) ABSTRACT

A storage device is provided for inter alia drink containers. The device includes a reservoir for a temperature conditioning material and multiple holders arranged in the reservoir. Each of the holders is configured for locating a drink container with a substantial portion of the same immersed in the temperature conditioning material when in use, whereby the drink container is removable therefrom for consumption and returnable thereto for temperature conditioning. The storage device further includes a first resilient member associated with each of the holders. The first member is formed with a number of displaceable elements arranged in a normal position to substantially cover the associated holder and are displaceable to an open position while engaging the drink container when same is located in the holder.

20 Claims, 12 Drawing Sheets

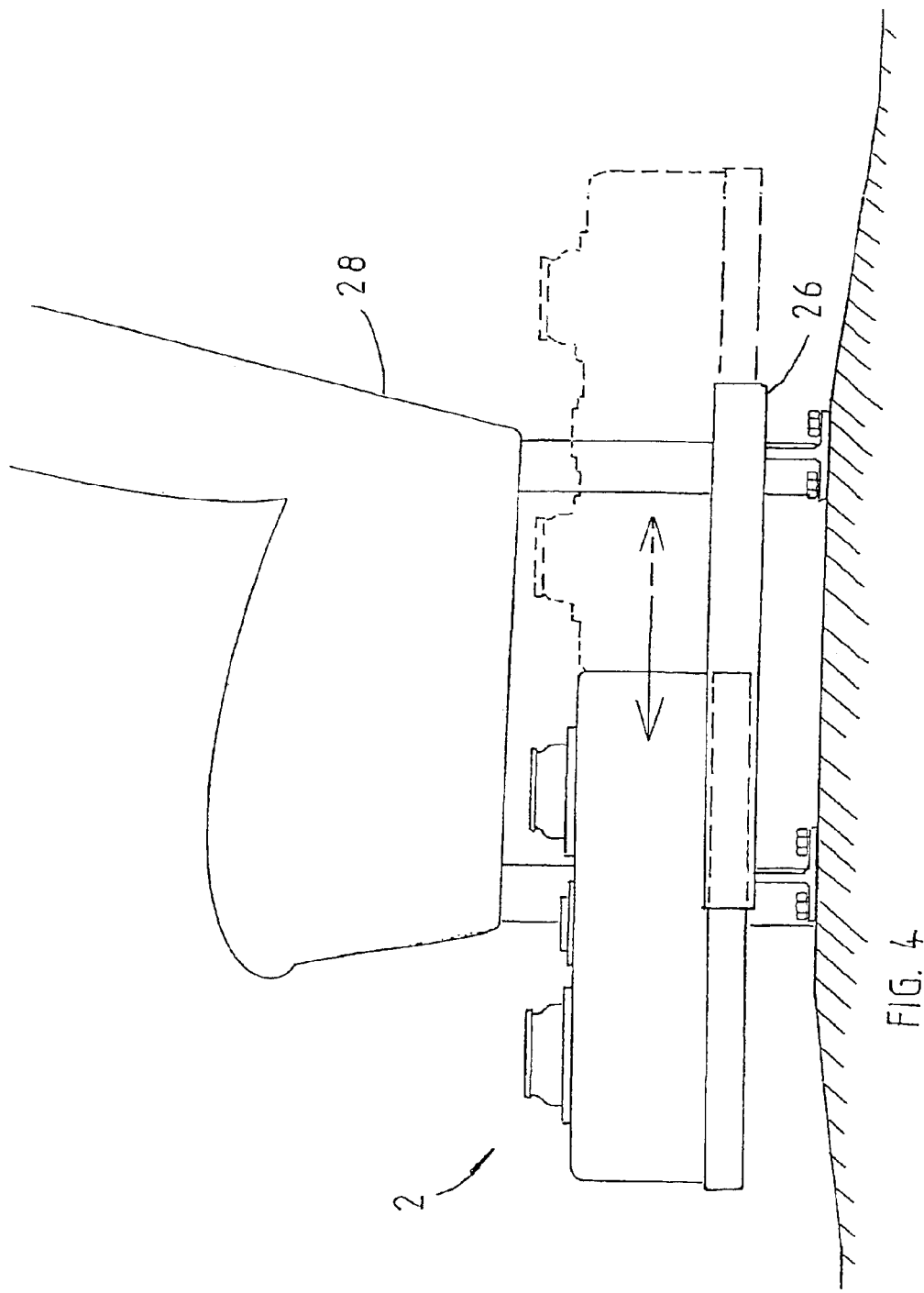

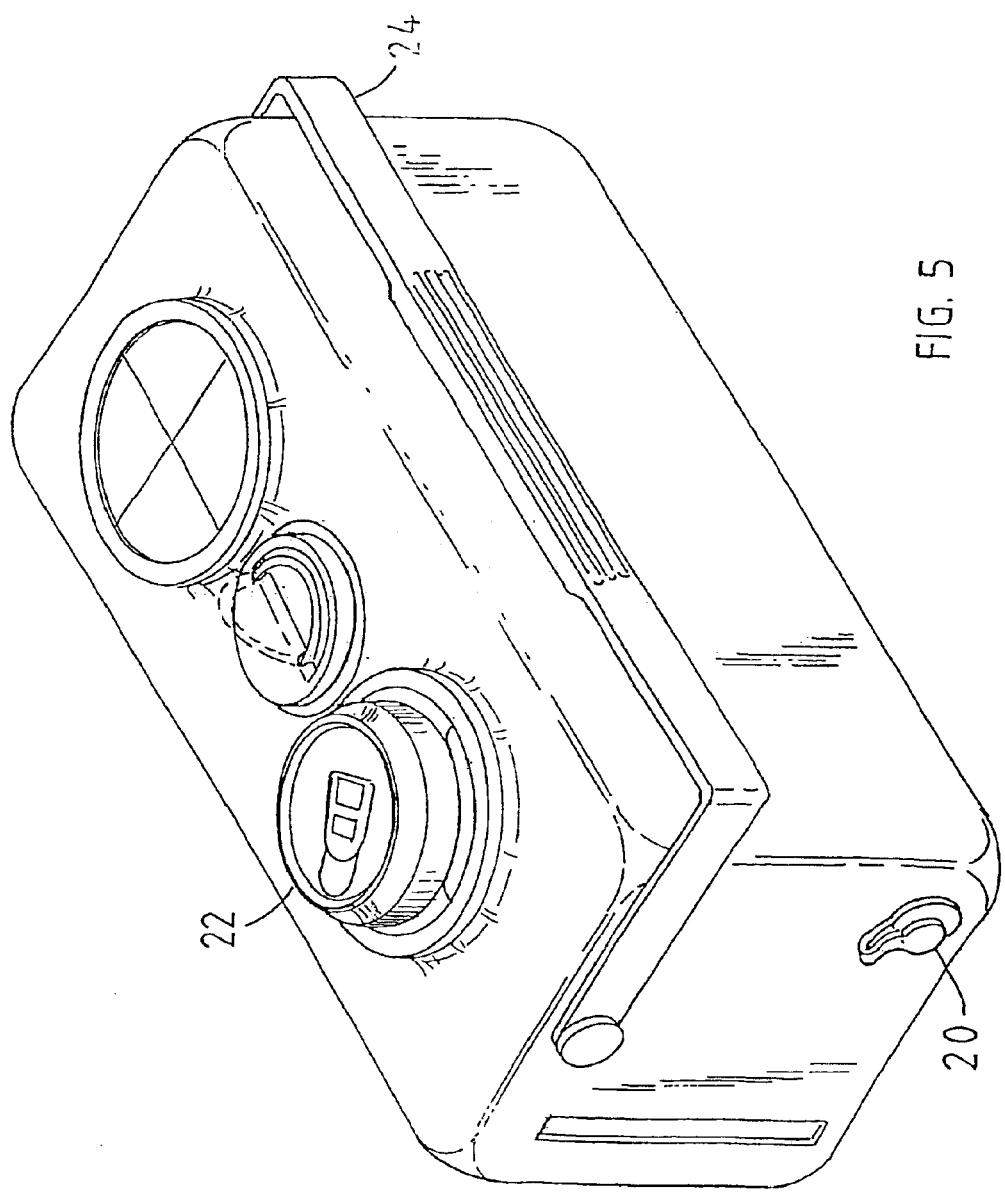

STORAGE DEVICE FOR DRINK CONTAINERS

TECHNICAL FIELD OF THE INVENTION

THIS INVENTION concerns a storage device for drink and/or food containers such as drink cans, bottles, box-pack drinks, paper cups or food boxes.

This invention also concerns a holder assembly for a storage device for drink and/or food containers such as drink cans, bottles, box-pack drinks, paper cups or food boxes.

BACKGROUND OF THE INVENTION

Wastage of drinks and foods through spillage and gradual warming is a problem in warm latitudes. Drinks and foods taken from a standard Esky-type container or from a refrigeration unit, if not consumed in a short period of time soon become warm and unpalatable or are even wasted through spillage. The standard polyurethane lined drink or stubbie bottle holder only stays cold for brief periods. It is also unstable in a vehicle or boat. Gel frozen drink liners have to be re-frozen to exert a useful effect.

In this specification the term "drink container" is intended to embrace a drink container or a food container, and includes any type of cans, bottles, box-packs, disposable cups, and boxes that can be used to contain drink or food items.

OBJECT OF THE INVENTION

An object of the present invention is to provide a storage device which alleviates or reduces to a certain level any one of the above prior art disadvantages.

SUMMARY OF THE INVENTION

In one aspect this invention provides a storage device for inter alia drink containers including a reservoir for a temperature conditioning material and multiple holders arranged in the reservoir, each of said holders being configured for locating a drink container (as hereinbefore defined) with a substantial portion of the same immersed in the temperature conditioning material when in use, whereby the drink container is removable therefrom for consumption and returnable thereto for temperature conditioning. The storage device further includes a first resilient member associated with each of said holders. Said first member is formed with a number of displaceable elements arranged in a normal position to substantially cover the associated holder and are displaceable to an open position while engaging said drink container when same is located in said holder.

In another aspect this invention provides a holder assembly for a storage device having a floor and at least one wall member arranged upstanding from said floor to define a storage compartment and a top opening. The assembly includes a frame member having at least one apertured section, and at least one insert member having one or more holders each configured for locating a drink container or containers. The frame member is configured for positioning said at least one apertured section above said floor in the compartment to thereby defining a reservoir for a temperature conditioning material between the floor and said at least one apertured section. The or each said at least one apertured section is arranged to receive and support the or one of said at least one insert in a manner that the one or more holders are substantially upright and, in use, at least partly immersed in the temperature conditioning material. The configuration of said one or more holders is such that a drink container(s) is removable therefrom for consumption and returnable thereto for temperature conditioning. The assembly further includes a first resilient member associated with each of said holders. Said first member is formed with a number of displaceable elements arranged in a normal position to substantially cover the associated holder and are displaceable to an open position while engaging said drink container when same is located in said holder.

It is preferred that said at least one insert including an insert with one or more holders configured for drink cans and/or drink bottles, and an insert with one or more holders for food items and boxed-shaped packages of drinks. The one or more holders may be removable supported about respective aperture(s) in each insert.

In one form said storage device is a cooler and said temperature conditioning material is coolant. In another form said storage device is a warmer and said temperature conditioning material is a heat generating material.

Said storage device may have at least one wall member surrounding said reservoir and a top member with apertures providing access to respective holders.

Advantageously, the storage device includes level indication means for indication the level of said temperature conditioning material in the reservoir. The level indication means can be in the form of an elongate lens fixed to an aperture in the or one of said at least one wall member.

The storage device is typically a shallow box with a floor arranged to support said holders in a substantially upright position. The holders can be formed as sleeves extending from the floor and said sleeves extend upwardly above said temperature conditioning material.

Alternatively, the shallow box may have a lid or top member, or each insert is, arranged to support said holders in a substantially upright position. The holders can be formed as sleeves extending into said temperature conditioning material and arranged to be supported in respective apertures of the lid/top member, or insert(s).

The sleeves may have gaps or apertures to permit the temperature conditioning material to reach the immersed drink containers.

Alternatively, the top member may have no lid and the box may be a blow moulding or a rotational moulding with apertures therewith, or the aperture(s) in each insert are arranged, to receive collars which are substantially co-axial with the sleeves.

Preferably, each of said collars incorporates said first resilient member with said elements extending radially inwardly therefrom. The elements may be in the form of tapered or flared liners, or flaps to respectively guide the drink containers to lie within the sleeves.

In another arrangement each said resilient member may be in the form of a first split diaphragm with flaps arranged to be displaced downwardly as the drink container is inserted and which re-close upon withdrawal.

At least one of said sleeves may have an internal ledge for suspending a second resilient member below said first resilient member. The second member also has a number of displaceable elements which extend radially inwardly for supporting the drink container thereon, and can be displaced downwardly by applying a downward force to the drink container. As for the first member, the second member can be a split diaphragm with flaps. The second split diaphragm is arranged for supporting thereon a relatively short drink container inserted through said first split diaphragm and for insertion therethrough of a relatively long drink container. As such the same holder can accommodate a drink container of different sizes, including a bottle and a can.

The box will normally be insulated. This may be achieved in different ways. It may be moulded of foam material or be a shell surrounded by padded insulation.

The device/holder assembly preferably has a port for insertion of the temperature conditioning material into the reservoir. A closure member is advantageously provided for removably closing the port. The port may be arranged near the centre of the reservoir to allow the temperature conditioning material to be dropped into the reservoir so that it occupies the space between the sleeves. Thus the spaces for the drink containers are maintained full of the temperature conditioning material. If the temperature conditioning material is ice the spaces for the drink containers are maintained full of the coolant but without ice. Accordingly there is always a liquid filled, ice free space in which to immerse the drink containers.

A mould assembly for forming block-formed coolant for use with the device/holding assembly as aforementioned. The mould assembly comprises a plurality of mould sections which are configured for removable connection to form a single unit. Each mould section has a housing with at least one housing wall arranged to define an interior chamber and a mouth at one end thereof in communication with the chamber. Said at least one housing wall includes first connection means and second connection means which are compatible for removable connection to the first connection means of an adjacent mould section. In use the plurality of mould sections are arranged as a single unit by connecting the first connection means of one mould section to the second connection means of another mould section and a coolant in liquid form is introduced into the chambers of the connected mould sections through respective mouths thereof. The mould assembly is then subject to a process for solidifying the coolant to a block form. The connected mould sections can be selectively disconnected for emptying the coolant blocks therein for use as coolant for the device/holding assembly as aforementioned.

Preferably, said housing has a handle part at its end opposite to the mouth so that a user can hold onto the mould section when emptying the coolant block therein.

Conveniently, the invention provides a carrier adapted to accommodate one or more mould assemblies. The carrier preferably has an insulation arrangement for minimising heat transfer so that the coolant blocks will remain solid for a longer tome period. The carrier may be substantially box-shaped and has a hollow for accommodating said one or more mould assemblies and a closure member for closing access to the hollow.

Each said mould section may also have spacer means at said one end thereof so that the closure means is spaced from the coolant while said one or more mould assemblies are in the hollow.

BRIEF DESCRIPTION OF THE DRAWINGS

Certain non-limiting embodiments of the invention are now described by way of example with reference to the accompanying drawings in which:

FIG. 4 is a diagram showing stowage of the device shown in FIG. 1;

FIG. 5 is a perspective view of a two unit storage device according to another embodiment of the present invention;

DETAILED DESCRIPTION OF THE DRAWINGS

Figure 1:
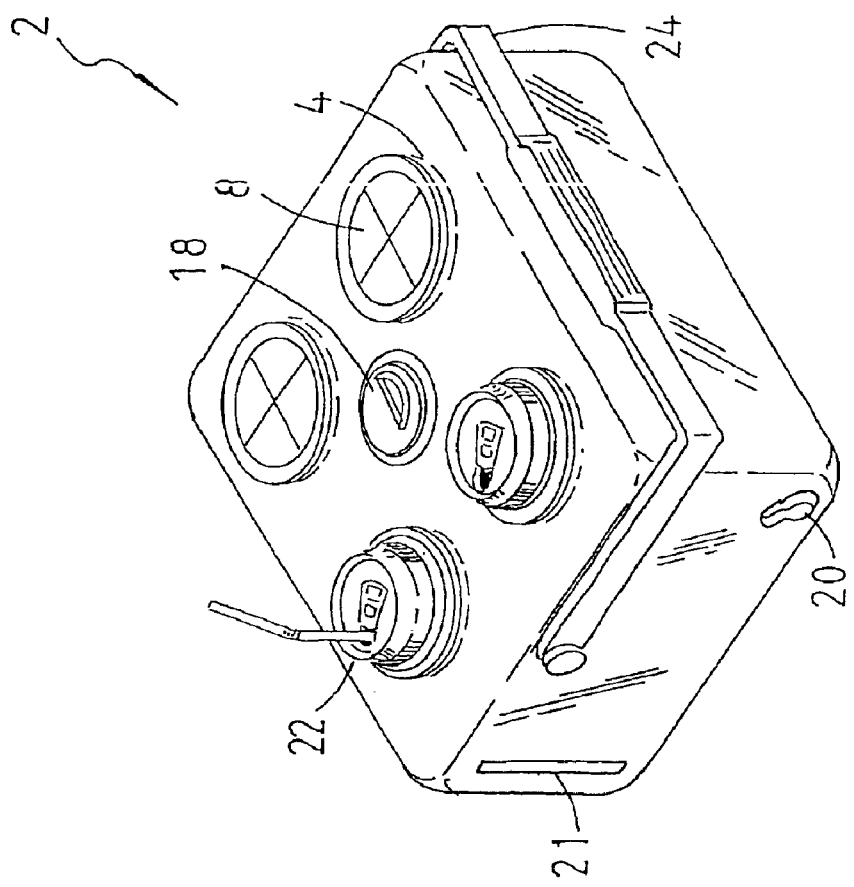
FIG. 1 is a perspective view of a four unit storage device according to one embodiment of the present invention.
Figure 2:
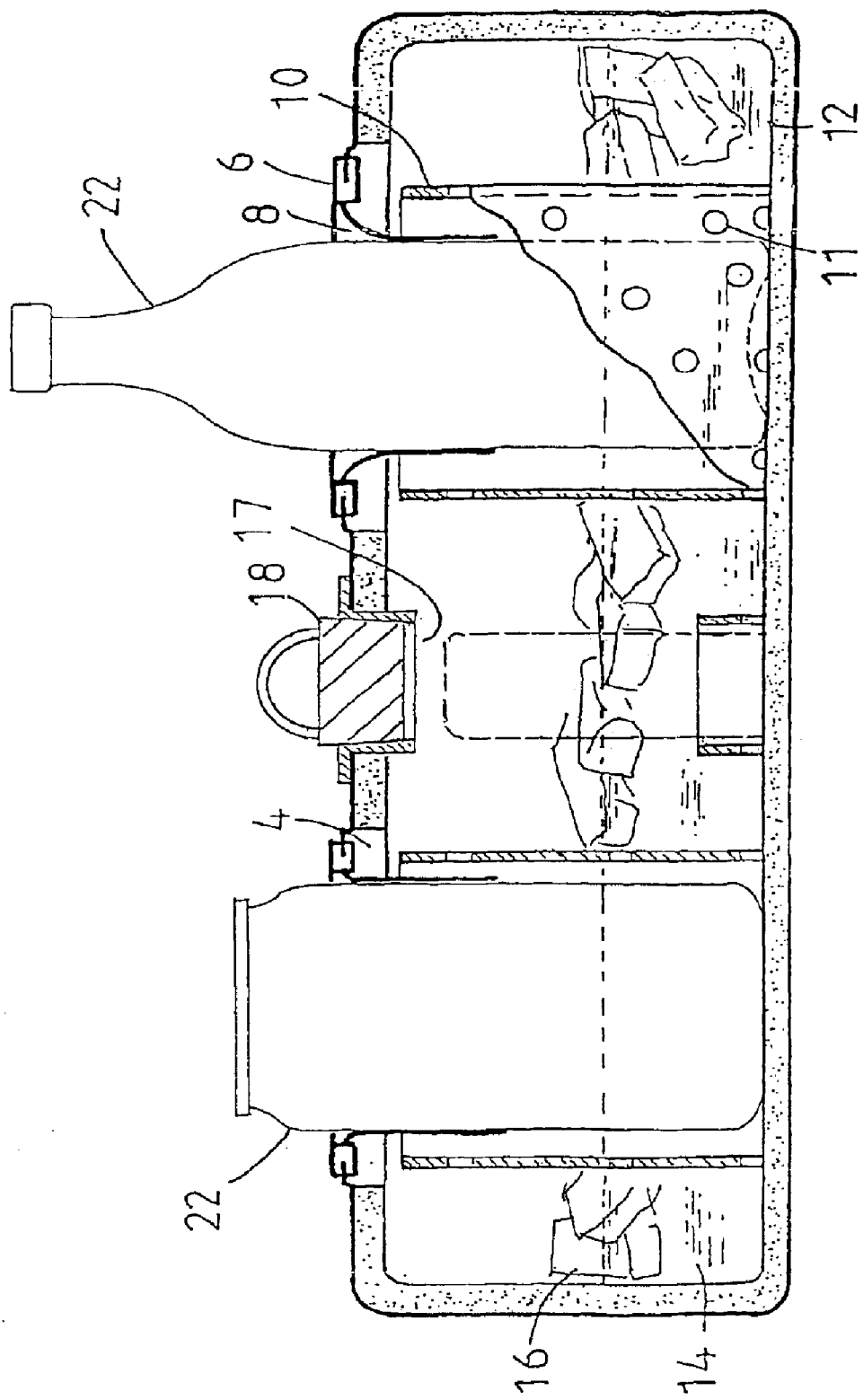
FIG. 2 is a section of the device shown in FIG. 1.
Figure 3:
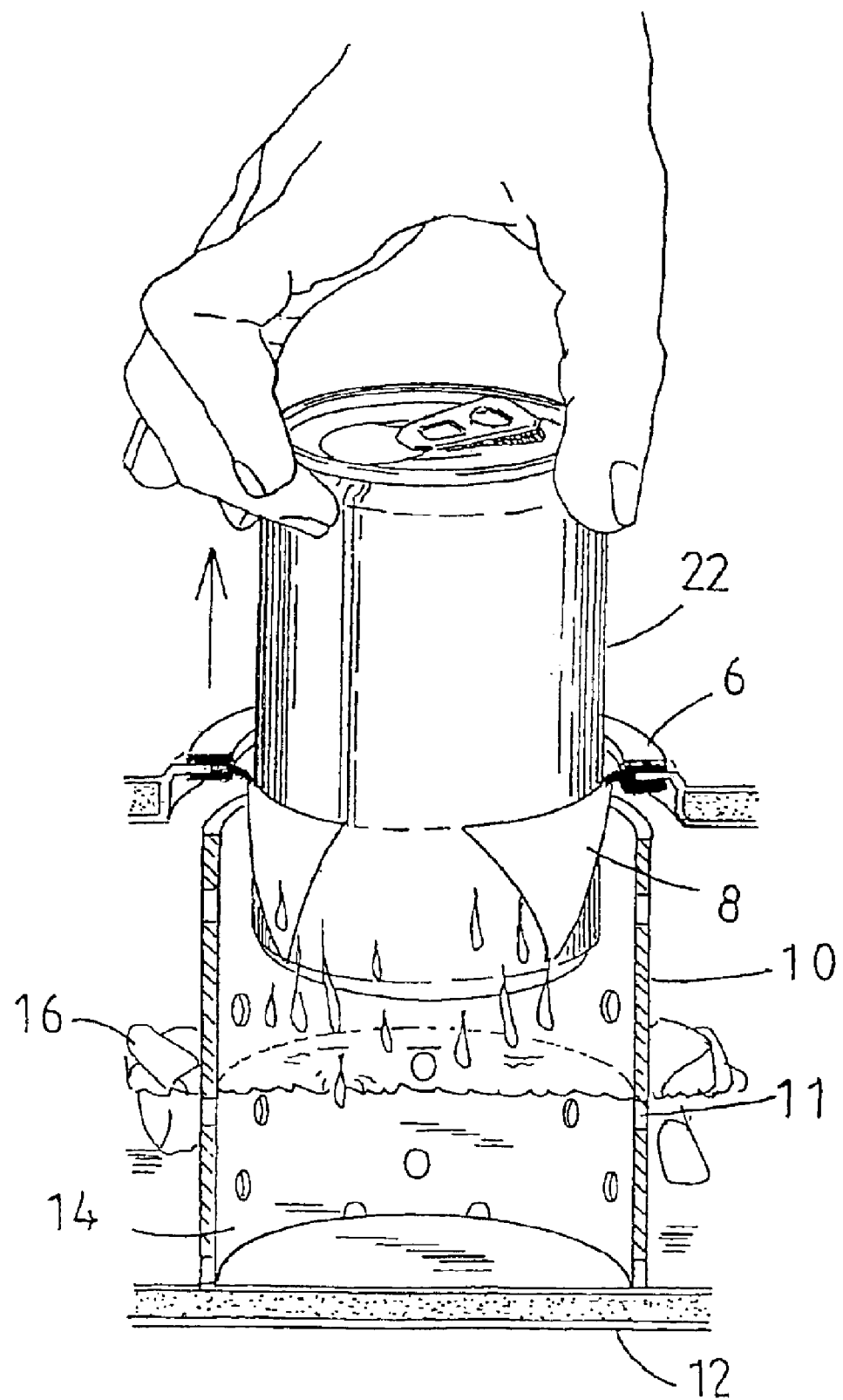
FIG. 3 shows the seal action of a diaphragm used in the device shown in FIG. 1.

Referring now to FIGS. 1 to 3, the embodiment of the storage device according to the present invention is in the form of a box 2 made by rotational moulding in foamed ABS.

The top of the box 2 has four apertures 4, each of which receives a polyethylene collar 6. Each of the collar 6 has a rubber diaphragm 8 for closing the respective aperture 4. Each diaphragm 8 has been cross slit to create four flaps.

A holder sleeve 10 is aligned with each of the apertures 4 and is fixed to the floor 12 of the box 2. The sleeves 10 are therefor co-axial with respective collars 6 and extent to just beneath respective collars 6.

Each of the sleeves 10 has perforations 11 to allow the passage of chilled water 14 but not ice blocks 16. The ice blocks 16 are introduced through a port 17 when a cap 18 is removed from the port 17.

A bung 20 (see FIGS. 1 and 5) is removably fitted to close a drain hole in a wall of the box 2. When the water level in the box 2 is too high the bung 20 can be unplugged to drain water, thereby allowing adjustment of the water level so that no overflow will occur when all the sleeves 10 are occupied with drink containers 22. A water level indication window 21 is fitted to the wall so that one can see the water level without having to remove the cap 18.

The diaphragms 8 grip against the containers 22 and accordingly assist in maintaining the containers in the upright position. At the same time, they provide a sealing action to minimise transfer of heat, whereby the coolant in box 2 can maintain the drinks in the container 22 comfortably cool for consumption for a relatively longer time.

In FIG. 3, a drink container 22 as shown is being pulled out from a sleeve 10. The diaphragm 8 of the collar 6 associated with this sleeve 10 grips onto the container 22 and wipes water 14 off the container 22 as it moves in the direction as indicated by the arrow sign. The diaphragm 8 will close the aperture 4 associated with the collar when the container 22 is pulled fully past the diaphragm 8.

While not shown, it is understood that the diaphragms 8 will adjust themselves for containers 22 of different sizes up to a maximum determined by the collars 6.

The box 2 has a carrying handle 24 so that the box 2 is conveniently carried from location to location. The box 2 can have a rail member to allow the box 2 to be loaded into a rack 26 beneath a vehicle seat 28 (see FIG. 4). Alternatively the handle 24 as shown in FIG. 1 can be adapted to function as a rail member. In this case the rack 26 will be positioned higher than as shown in FIG. 4.

Figure 6:
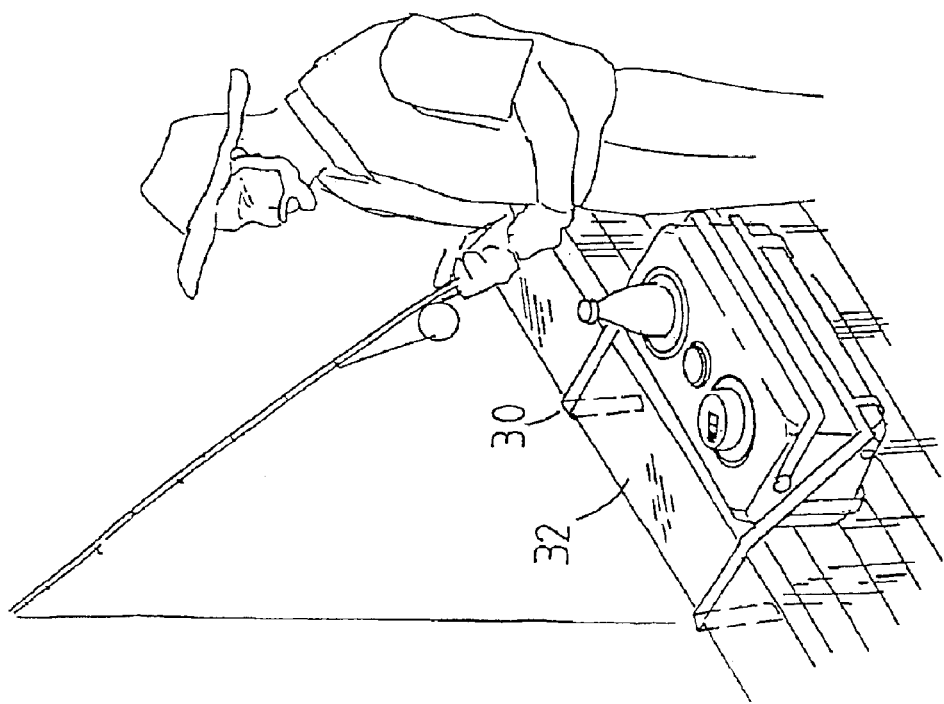
FIG. 6 shows a hull mounting arrangement for the device shown in FIG. 5.

A bracket 30 (see FIG. 6) can be configured for supporting the box 2 about a boat rail 32. While it is not shown it should be understood that the box 2 can be configured to have a bracket engagement means such as a recess for receiving a mounting bracket that is fixed to a part of a vehicle, or extended flanges for engaging the periphery about a recess in a vehicle. As an alternative, the box 2 can be provided with a strap and snap clip arrangement for adjustably strapping the box 2 to items such as a car seat, etc.

Figure 7:
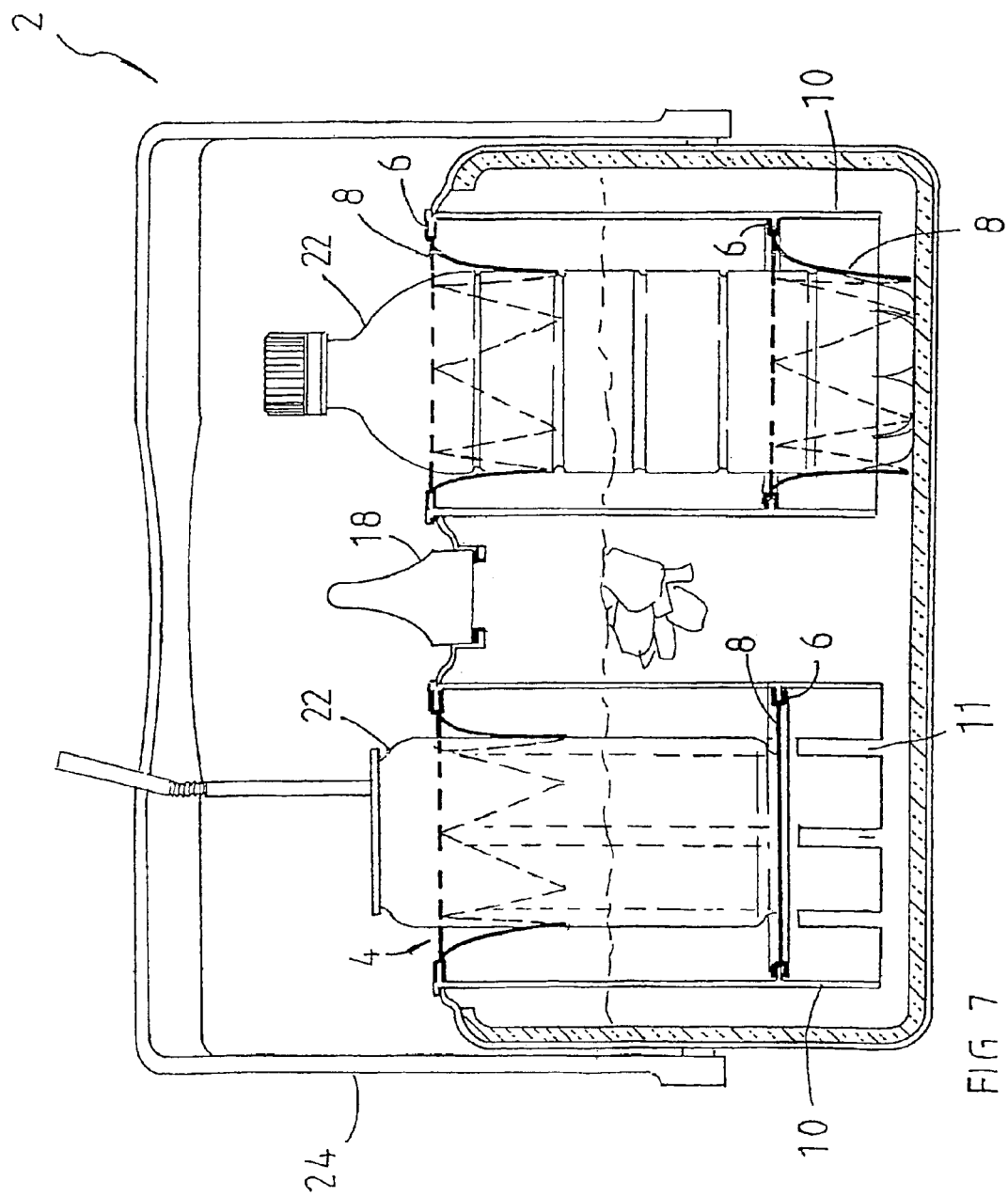
FIG. 7 is a section view of a two unit storage device according to a further embodiment of the present invention.

Referring now to FIG. 7 the storage device 2 shown therein is substantially similar to the device 2 described earlier with the exception of the configuration of the sleeves 10.

Figure 8:
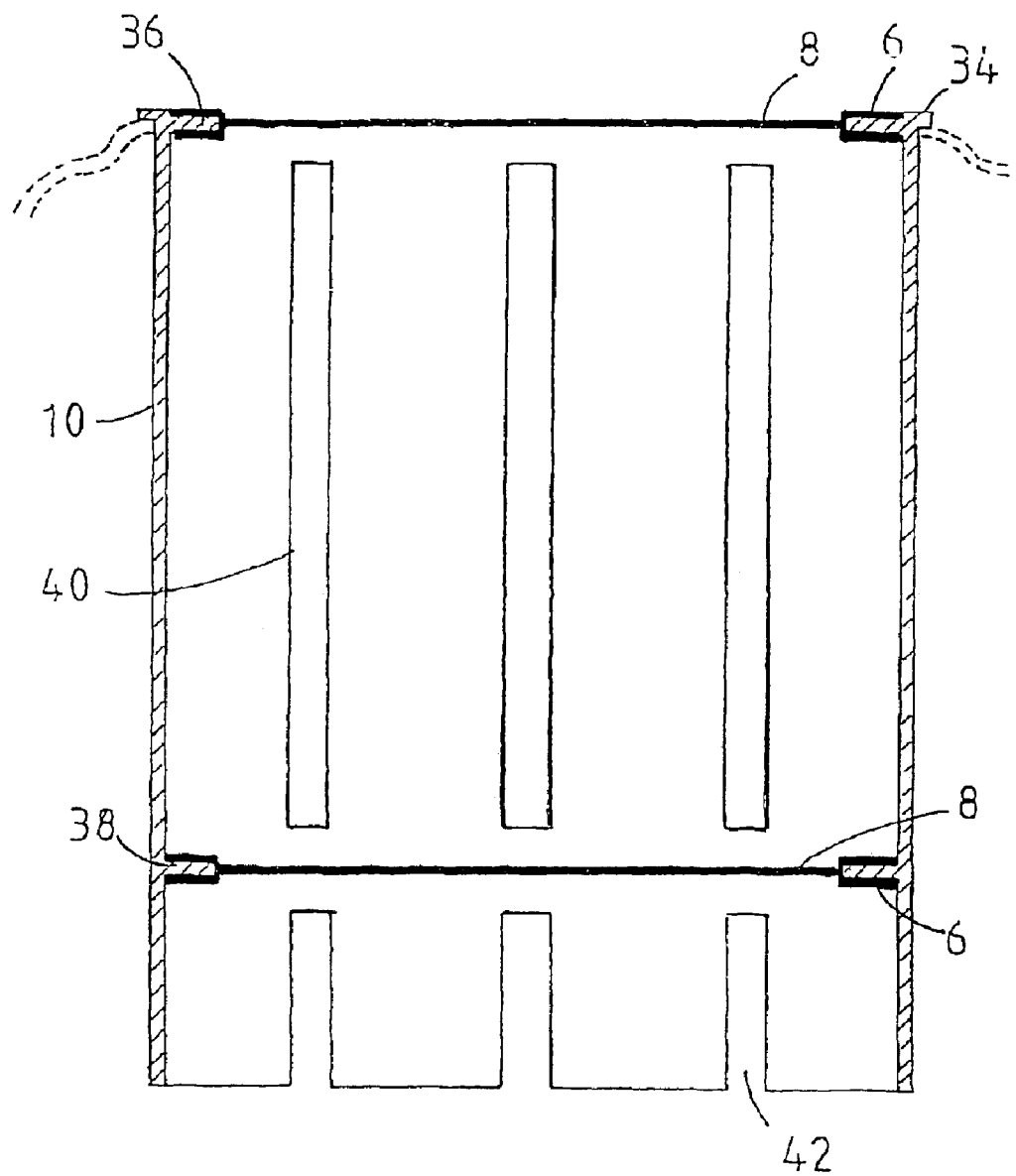
FIG. 8 is a section view of an example of the holders for the device according to the present invention.
Figure 9:
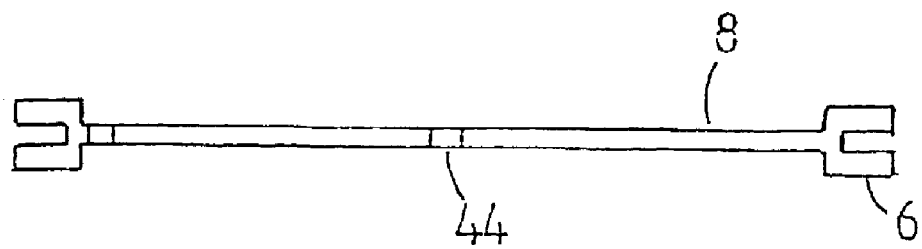
FIG. 9 is a side section view of an example of the split diaphragm for the holder.
Figure 10:
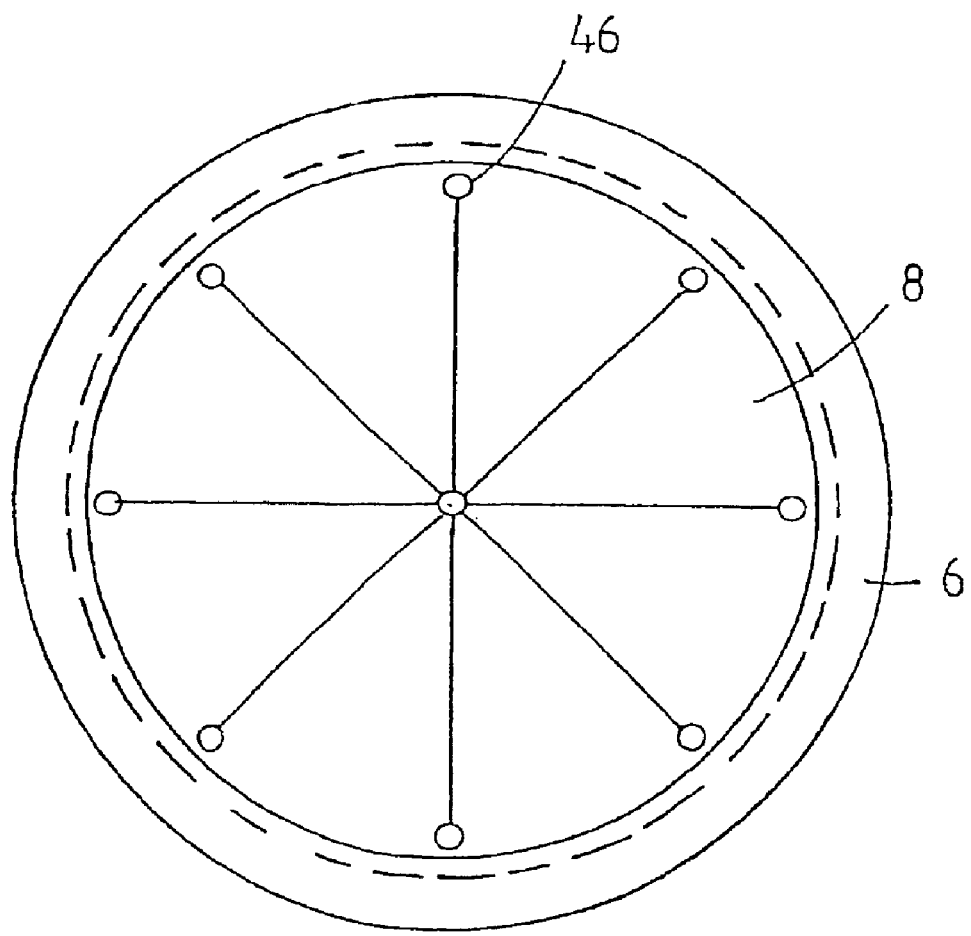
FIG. 10 is a plan view of the split diaphragm.

Each of the sleeves 10 as shown in FIG. 7 has a rim 34 (see FIG. 8) positioned and suspended over the associated apertures 4. The rim 34 has an internal ledge 36 to which is clamped a collar 6 from which a diaphragm 8 extends radially inwardly as shown in FIGS. 9 and 10. The sleeve 10 also has another ledge 38 partway up from its lower end. Clamped to the ledge 38 is another collar 6 which also has a diaphragm 8 extending radially inwardly. The diaphragm 8 at the lower ledge 38 is made sufficient stiff that it can support a drinks can 22 as shown in FIG. 7. Where the sleeve 10 is used to hold a tall drinks container such as a bottle 22 a user simply applies a little pressure to move the diaphragm 8 to bent downwardly as shown in FIG. 7 so that the bottle 22 can rest on the floor of the device 2.

The sleeve 10 for the device 2 in FIG. 7 has apertures in the forms of slots 40 and recesses 42 instead of round apertures 11 described earlier.

The diaphragm 8 as shown in FIGS. 9 and 10 has eight sector shaped flaps pointing to a centre hole 44. Holes 46 arranged adjacent to the collar 6 and between adjacent flaps allow easier bending of the flaps.

Figure 11:
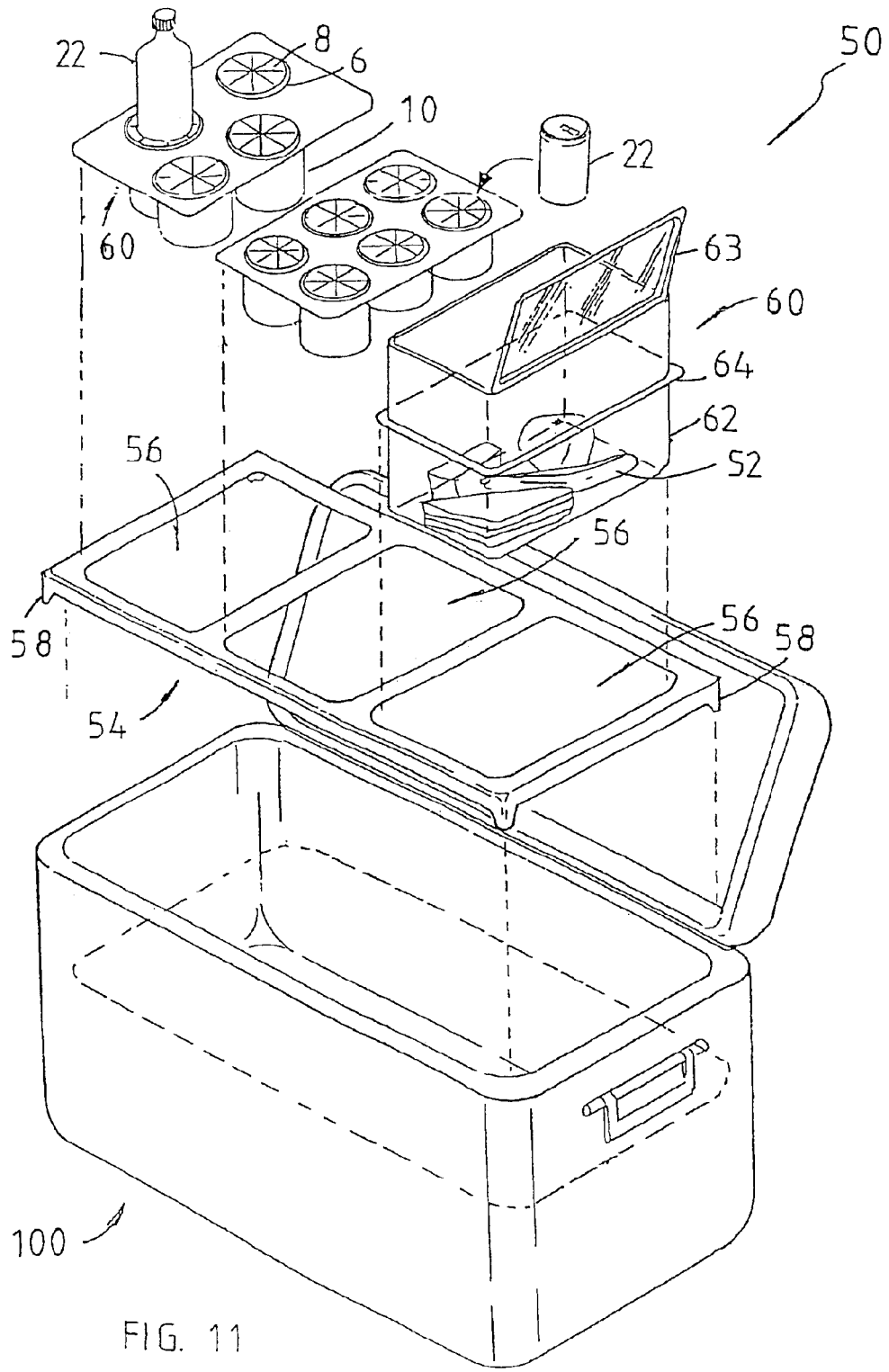
FIG. 11 shows an exploded view of an embodiment of a holder assembly for an ice box, according to the present invention.

Referring now to FIG. 11, there is shown a holder assembly 50 according to the present invention. The assembly 50 is for a holding drink containers 22 and food items 52 in an ice box 100 (commonly called Esky). The assembly 50 has a frame member 54 with three apertured sections 56. The frame member 54 includes feet 58 at its corners. The feet 58 are sized so that when the frame member 54 is positioned in the ice box 100, the apertured sections 56 are above the bottom of to an extend that inserts 60 in the sections 56 can be supported on the frame member 54. Such a position of the frame member 54 is indicated by the dotted lines around the ice box 100.

The inserts 60 can be adapted for different uses. In this embodiment, two of the inserts are fro drink containers 22 and one for food items 52. Each of the inserts 60 for holding drink containers 22 has an array of holding sleeves 10 each associated with a collar 6 and a diaphragm 8 as described with reference to FIGS. 7 to 10. The insert 60 for food items 52 is in the shape of a box 62 with a lid 63 at its top and a flange 64 arranged at a position partway up from its base. The flange 64 is sized so that the box 62 can be supported on the frame member 54 when positioned into an apertured section 56.

In this embodiment coolant such as ice blocks are placed in the ice box 100 before the last apertured section receives an insert 60.

Figure 12:
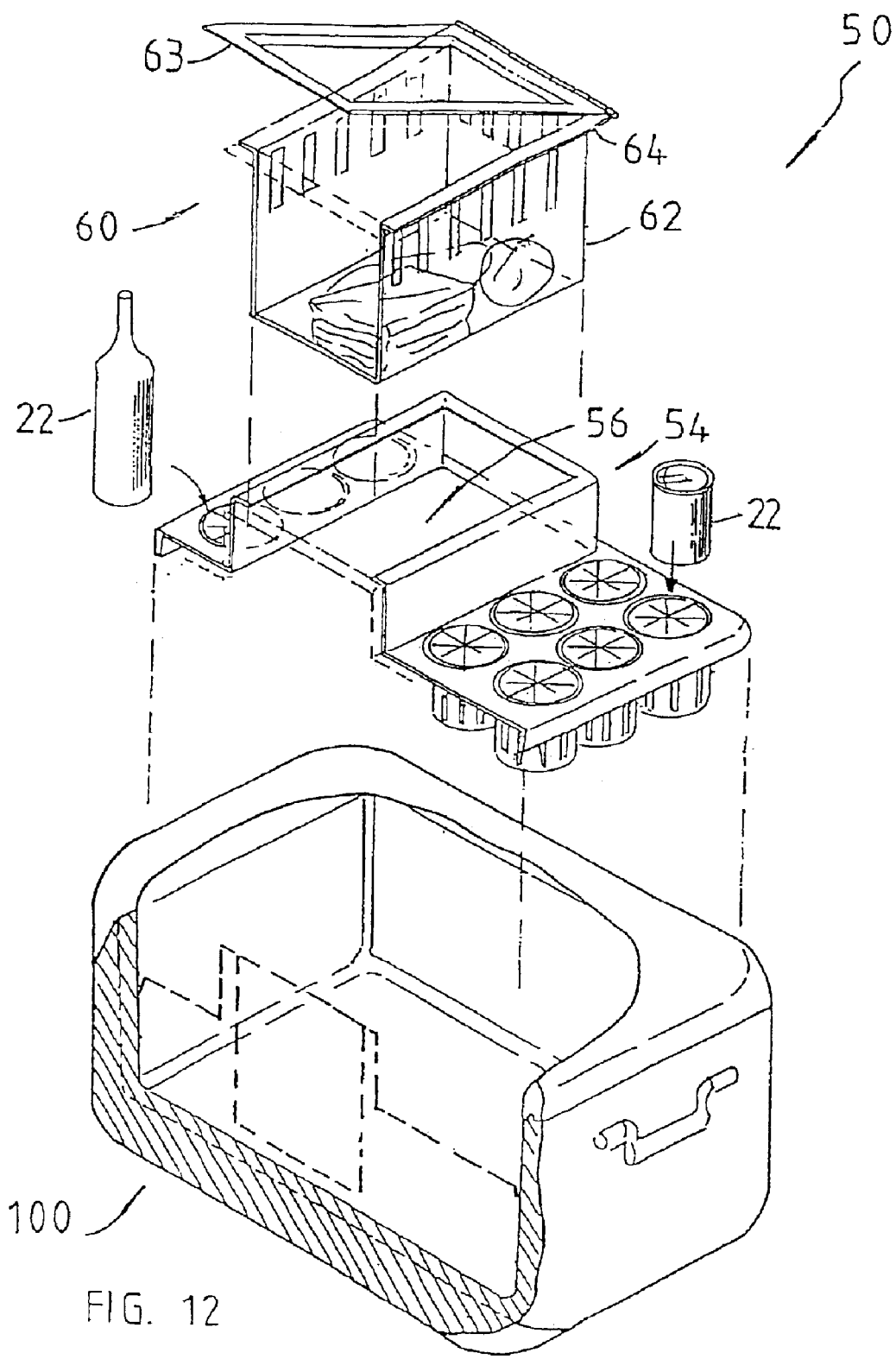
FIG. 12 shows an exploded view of another embodiment of a holder assembly for an ice box, according to the present invention.

The holder assembly 50 of the embodiment shown in FIG. 12 is substantially similar to the assembly 50 in FIG. 11 except for that the inserts for the drink containers 22 are integrally formed with the frame member 54, and that the frame member 54 has a raised apertured section 56 to receive the food item insert 60. This insert 60 has a box 62 with a top flange 64 for resting on the frame member 54.

Figure 13:
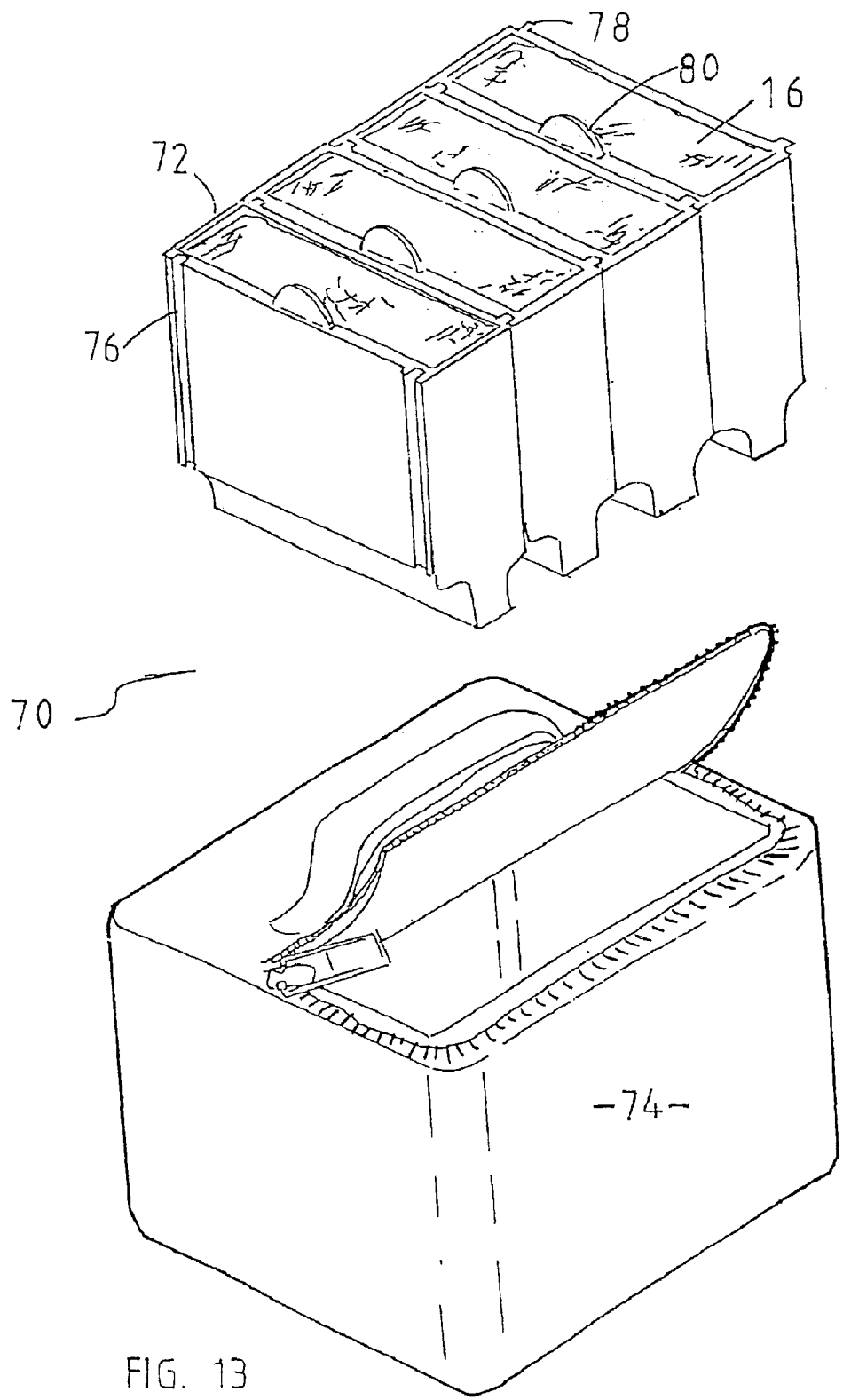
FIG. 13 shows ab embodiment of a mould assembly for the storage device and the holder assembly according to the present invention.

FIG. 13 shows a coolant mould assembly 70 with an array of connectable mould sections 72 and an insulated carry bag 74 for stowing of the connected sections 72.

Each of the sections 72 has a hollow bounded walls. One of the walls has female connection means in the form of spaced grooves 76 and its opposite wall has a compatible male connection means in the form of spaced projections 78. The grooves 76 and the projections 78 are configured for snap fitting so that sections 72 when connected will stay together until forced to separate apart. The array of the connected sections 72 are placed in the bag 74 for stowage, and the bag 74 has a closeable top opening for insertion and removal of the array of mould sections 72. To prevent the top of the bag 74 from contacting the coolant blocks 16 the sections 72 have raised parts 80 which serve as spacers for keeping the top cover of the bag 74 from contacting the coolant.

Figure 14:
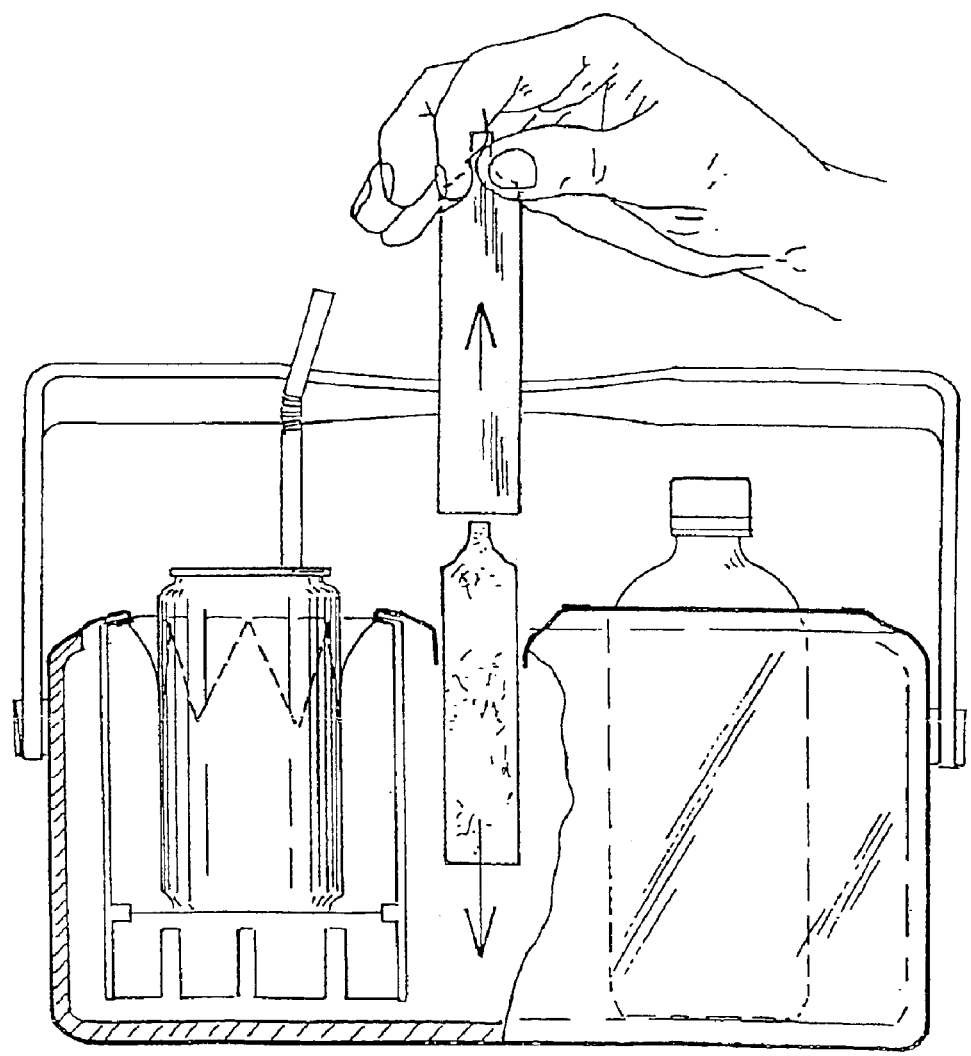
FIG. 14 shows the mould assembly of FIG. 13 being used to introduce a moulded coolant block into the storage assembly according to the present invention.

The sections 72 also have a narrowed lower part serving as a handle for a user to hold onto when inverting a section 72 for emptying the coolant block 16 into a storage device as shown in FIG. 14.

I have found the advantages of the above embodiment to be:

1. If the boat or vehicle has a refrigerator the device which is portable can be refilled with ice.
2. If the device is overturned it can be righted without substantial leakage.
3. The diaphragms help to keep the containers cold or hot for a longer time as they reduce transfer of heat to or from atmosphere.
4. The diaphragms wipe coolant or heating material from the containers as they are removed from the device.

Whilst the above has been given by way of illustrative example of the present invention many variations and modifications thereto will be apparent to those skilled in the art without departing from the broad ambit and scope of the invention as herein set forth.

What is claimed is:

1. A storage device for drink containers including a reservoir for a temperature conditioning material and multiple holders arranged in the reservoir, each of said holders being configured for locating a drink container (as hereinbefore defined) with a substantial portion of the same immersed in the temperature conditioning material when in use, the holders being in the form of sleeves arranged to extend into said temperature conditioning material and the sleeves having gaps or apertures to permit the temperature conditioning material to reach the immersed drink containers, whereby the drink container is removable therefrom for consumption and returnable thereto for temperature conditioning; a first resilient member associated with each of said holders, said first member being formed with a number of displaceable elements arranged in a normal position to substantially cover the associated holder and to be displaceable while engaging said drink container when same is located in said associated holder, said storage device having at least one wall member surrounding said reservoir and a top member with apertures providing access to respective holders, each aperture being adapted to receive a collar arranged substantially co-axial with the sleeves, and the collar incorporating said first resilient member with said elements extending radially inwardly therefrom.

2. The invention according to claim 1 wherein the storage device is a shallow box with a floor arranged to support said holders in a substantially upright position, and a lid or top member having apertures substantially in alignment with the holders.

3. The invention according to claim 1 wherein the storage device is a shallow box with a lid or top member arranged to support said holders in a substantially upright position and having apertures substantially in alignment with the holders.

4. A holder assembly for a storage device having a floor and at least one wall member arranged upstanding from said floor to define a storage compartment and a top opening, the assembly including a frame member having at least one apertured section arranged to either support an insert member having one or more holders each configured for locating a drink container and aperture(s) in alignment with said one or more holders, or incorporate one or more holders each configured for locating a drink container and aperture(s) in alignment with said one or more holders, the frame member being configured for positioning said at least one apertured section above said floor in the storage compartment to thereby providing a reservoir for a temperature conditioning material between the floor and said at least one apertured section, the or each said at least one apertured section being arranged so that the one or more holders are substantially upright and, in use, at least partly immersed in the temperature conditioning material, the holders being in the form of sleeves arranged to extend into said temperature conditioning material and the sleeves having gaps or apertures to permit the temperature conditioning material to reach the immersed drink containers, the configuration of said one or more holders being such that a drink container(s) is removable therefrom for consumption and returnable thereto for temperature conditioning; and a first resilient member associated with each of said holders, said first member being formed with a number of displaceable elements arranged in a normal position to substantially cover the associated holder and to be displaceable while engaging said drink container when same is located in said associated holders, each aperture being adapted to receive a collar arranged substantially co-axial with the sleeves, and the collar incorporating said first resilient member with said elements extending radially inwardly therefrom.

5. The invention according to claim 4 wherein said insert member being arranged to support said holders in a substantially upright position.

6. The invention according to claim 4 wherein said one or more holders being configured for holding drink cans and/or drink bottles, and/or for food items and boxed-shaped packages of drinks.

7. The invention according to claim 1 wherein said storage device is a cooler or warmer, and said temperature conditioning material is a coolant where the storage device is a cooler or a heat generating material where the storage device is a warmer.

8. The invention according to claim 1 wherein further including level indication means for indication the level of said temperature conditioning material in the reservoir.

9. The invention according to claim 1 wherein at least one of said sleeves having an internal ledge for suspending a second resilient member below said first resilient member, the second member having a number of displaceable elements which extend radially inwardly for supporting the drink container thereon, and can be displaced downwardly by applying a downward force to the drink container.

10. The invention according to claim 1 wherein the elements are in the form of tapered or flared liners, or flaps to respectively guide the drink containers to lie within the sleeves.

11. The invention according to claim 1 wherein the first resilient member is in the form of a first split diaphragm with the elements in the form of flaps arranged to be displaced downwardly as the drink container is inserted and which re-close upon withdrawal.

12. The invention according to claim 9 wherein the second member is in the form of a split diaphragm with its elements in the form of flaps.

13. The invention according to claim 1 wherein said storage device having a port for insertion of the temperature conditioning material into the reservoir.

14. The invention according to claim 13 wherein a closure member is provided for removably closing the port.

15. The invention according to claim 1 wherein the temperature conditioning material is ice and the gaps or apertures in the sleeves are such that only melted ice can flow through the gaps or apertures and the drink containers are immersed in the melted ice in the sleeves.

16. A mould assembly for forming block-formed coolant for use with the invention as claimed in claim 1, the mould assembly including a plurality of mould sections which are configured for removable connection to form a single unit, each mould section having a housing with at least one housing wall arranged to define an interior chamber and a mouth at one end thereof in communication with the chamber, said at least one housing wall including first connection means and second connection means which are compatible for removable connection to the first connection means of an adjacent mould section, wherein in use the plurality of mould sections are arranged as a single unit by connecting the first connection means of one mould section to the second connection means of another mould section and a coolant in liquid form is introduced into the chambers of the connected mould sections through respective mouths thereof, subjecting the mould assembly to a process for solidifying the coolant to a block form, thereafter the connected mould sections can be selectively disconnected for emptying the coolant blocks therein for use as coolant for the invention.

17. The assembly according to claim 16 wherein said housing has a handle part at its end opposite to the mouth so that a user can hold onto the mould section when emptying the coolant block therein.

18. The assembly according to claim 17 wherein further including a carrier adapted to accommodate at least one said mould assembly, the carrier having an insulation arrangement for minimising heat transfer so that the coolant blocks will remain solid for a longer time period, a hollow for accommodating at least one said mould assembly and a closure member for closing access to the hollow.

19. The assembly according to claim 18 wherein each said mould section having spacer means at said one end thereof so that the closure means is spaced from the coolant while said one or more mould assemblies are in the hollow.

20. A storage device for drink containers, the device comprising:

a liquid reservoir for holding a temperature conditioning material;

a top member over said reservoir; and plural drink container holders in said top member, each of said holders having a sleeve that extends into said reservoir, said sleeve having openings permitting passage of a liquid temperature conditioning material held in said reservoir, and said sleeve having a resiliently deformable membrane extending across an opening defined by said sleeve that inhibits passage of a liquid temperature conditioning material held in said reservoir, said membrane having separable elements that resiliently deflect to receive a drink container.

* * * * *